United States Patent [19]

Peterson

[11] Patent Number: 4,676,391

[45] Date of Patent: Jun. 30, 1987

[54] IMPACT PLUG ASSEMBLY

[75] Inventor: Francis C. Peterson, Woodbury, Conn.

[73] Assignee: Buell Industries, Inc., Waterbury, Conn.

[21] Appl. No.: 889,427

[22] Filed: Jul. 23, 1986

[51] Int. Cl.$^4$ .............................................. B65D 53/00
[52] U.S. Cl. ...................................... 220/233; 220/323
[58] Field of Search ............... 220/233, 234, 315, 314, 220/307, 323

[56] References Cited

U.S. PATENT DOCUMENTS

| | | | |
|---|---|---|---|
| 3,944,107 | 3/1976 | Wallace et al. | 220/323 |
| 3,990,604 | 11/1976 | Barnett et al. | 220/323 |
| 4,634,018 | 1/1987 | Becker | 220/233 |

Primary Examiner—George T. Hall
Attorney, Agent, or Firm—St. Onge Steward Johnston & Reens

[57] ABSTRACT

An improved impact plug assembly is provided which will not become entangled with neighboring such assemblies when a plurality thereof is shipped or stored in containers prior to use to close apertures in a workpiece. The plug is of the type having a cooperating crossbar for locking the plug in place in the aperture to be closed, the crossbar being retained in diametrically opposed slots formed in the peripheral walls of said plug. The improvement comprises the provision of raised means such as dimples on the surface of the plug on each side of the crossbars to prevent projecting edges of crossbars of neighboring plugs in a storage bin from becoming inextricably entangled.

8 Claims, 5 Drawing Figures

IMPACT PLUG ASSEMBLY

BACKGROUND OF THE INVENTION

1. Field of the Invention

This invention relates to an improved impact or bang plug assembly comprising a plug and mating crossbar and is more particularly concerned with an impact or bang plug assembly which will not become inextricably entangled with neighboring such plugs when a plurality of the same are shipped or stored in close proximity.

2. Discussion of the Prior Art

Impact or bang plug assemblies are known in the prior art for engaging a workpiece to close or seal an aperture formed therein. A typical application for a bang plug is closing off circular openings in the sheet metal of an automobile underbody, which openings are cut so that the whole body may be dipped in a paint bath and excess paint residue still drain out through the openings.

The typical bang plug assembly comprises a circular plug of metal for insertion into a circular opening. The plug may be shaped like a shallow, thin, flat-bottomed bowl with a relatively flat bottom wall portion for extending across the aperture and adjoining sidewall portions for mating with the workpiece boundary defining the aperture.

An elongated crossbar comprising an angled strip of metal is positioned inside and above the plug bottom in diametrically opposed slots formed in the plug sidewall adjacent the bottom wall, with the two opposite ends of the crossbar protruding through these slots only a relatively short distance. The two opposing ends of the crossbar are retained inside the slots and therefore inside the plug, while the angled portion of the crossbar midway between the two ends is poised above the plug bottom, the total length of the crossbar being substantially greater than the diameter of the plug. The plug is placed in the sheet metal opening, and the crossbar is typically struck with a hammer in a direction toward the plug bottom, or downwardly. The ends of the crossbar are forced out through the slots as simultaneously the angled portion of the crossbar is forced downward, is straightened, and comes to rest on the bottom wall or landing platform of the plug. The crossbar ends, which are suitably curved, are thereby driven or extended out through the slots into engagement with the underside of the sheet metal workpiece adjacent the aperture to lockingly retain the plug in place.

Before the plug assembly is installed and the crossbar driven into place, the crossbar sits relatively loosely in the plug and is typically retained in the slots by circular depressions or dimples formed in the crossbar material just on the outer side of the plug sidewalls. These dimples are designed to restrain the crossbar ends from being pulled or otherwise deformed back through the slots.

The spring action in the dimple transverse to the direction of travel of the crossbar through the slot permits the crossbar material in the region of the dimple to flex or be momentarily displaced as the dimple passes through the slot. There is a specific spring constant associated with the dimple that permits this flexing to take place. This spring or flexing action may permit the dimple to be pulled or forced back through the slot, thereby possibly resulting in the undesirable separation of the crossbar from the plug as the plug assemblies are shipped in mass or otherwise handled prior to installation.

In pending application Ser. No. 811,678 filed Dec. 20, 1985 there is described an improved means of ensuring retention of the crossbar in the plug prior to use in sealing an aperture. Said application describes the provision of shear lip means formed in opposite ends of the crossbar outwardly of the plug. The shear lip means is adapted to engage the plug walls adjacent the slots in the wall and thereby prevent inward removal of the crossbar from the slot.

It has been found however that the above types of impact plug assembly, especially those which have been galvanized, have a pronounced tendency to become inextricably entangled one with another when stored and or transported in storage bins and the like prior to use. Indeed it is found that as much as about 15 percent by number of the plugs in such a storage bin can become so entangled as to be incapable of being separated. Since separation is impossible short of physically destroying the individual entangled plugs there is no alternative but to discard the same.

It has now been found that this problem can be overcome in a simple but elegant manner by the improvement which is described in detail hereinafter.

SUMMARY OF THE INVENTION

It is an object of the invention to provide an improved impact plug assembly which is substantially free from the potential to become entangled with neighboring such assemblies when a plurality of the same are stored in close proximity to each other.

This object, and other objects which will become apparent to one skilled in the art in the light of the following description, is achieved by the improved impact plug assembly of this invention. The latter, in its broadest aspect, comprises an impact plug assembly for engaging a workpiece to close an aperture extending through said workpiece, said assembly comprising a plug sized for insertion into said aperture, a crossbar retained in diametrically opposed slots formed in the peripheral walls of said plug, said crossbar being adapted to be extended outwardly through said slots to lockingly engage said workpiece and sealingly retain said plug in said aperture wherein the improvement comprises raised means provided on the surface of the plug at locations flanking those portions of the crossbar which, in the unextended position of the latter, are proximate the slots in the sidewalls through which the ends of the crossbar protrude. In a particular embodiment the crossbar is also provided with shear lip means to restrict the same from removal inwardly through the slots.

DETAILED DESCRIPTION OF THE PREFERRED EMBODIMENT

Figure 2:
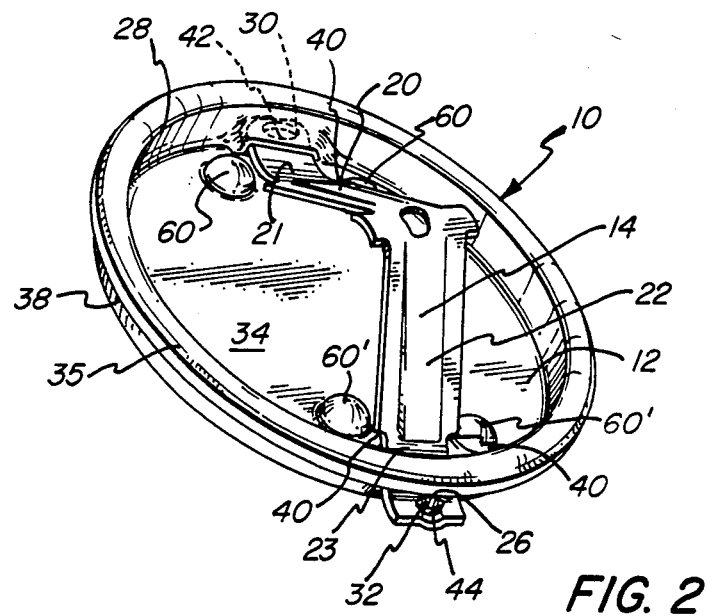
FIG. 2 shows a perspective view of the improved impact plug assembly in FIG. 1.
Figure 1:
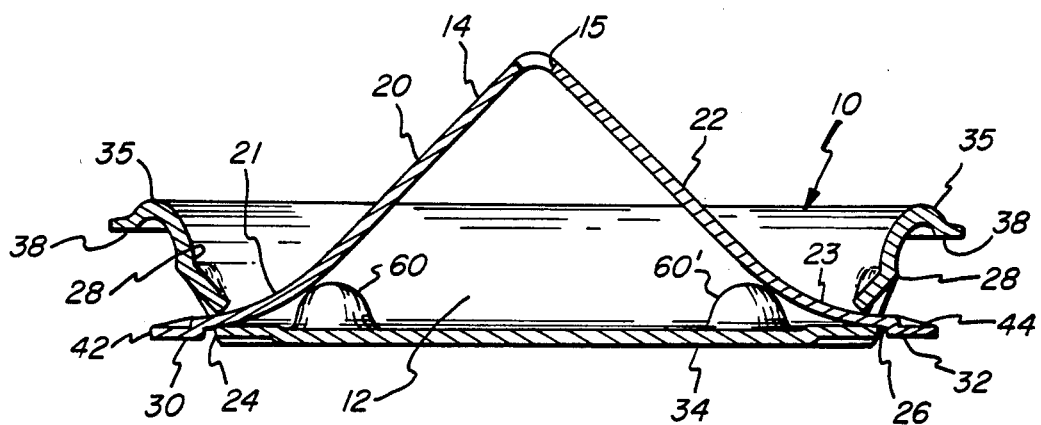
FIG. 1 shows a cross-sectional side elevation view of the improved impact plug assembly of the present invention in the uninstalled condition.

As seen in FIGS. 1 and 2, the improved impact plug assembly 10 of the present invention comprises a plug 12 and an elongated crossbar 14. Plug 12 is generally stamped or pressed from a sheet of metal such as 1010 steel and may be treated by galvanizing to prevent corrosion, although the plug may also be formed of other materials such as aluminum. Plug 12 is disc shaped and resembles a relatively shallow, flat-bottomed bowl. Plug 12 has a bottom wall 34 for extending across the aperture formed in the workpiece. Plug 12 further has sidewalls 28 joining the bottom wall 34. Sidewalls 28 are typically of uniform depth around the entire perimeter and terminate in a rim 35. Rim 35 forms a flange 38 for engaging the workpiece adjacent the aperture as described below. When the plug is locked into the aperture as described below, the flange 38 sealingly engages the workpiece to seal the aperture.

As shown in FIG. 2, plug 12 is typically circular and can be of any chosen diameter to fit into and seal a generally circular aperture. It is understood however that any shape plug corresponding to any shape aperture can in principle be used consistently with the present invention.

The plug 12 is retained in place in the aperture by means of crossbar 14 that is forced, typically by impact, into a locking position after the plug 12 is positioned or inserted into the aperture to be sealed.

Crossbar 14 comprises an elongated strip of metal having two legs 20 and 22, which terminate in feet 21 and 23. Legs 20 and 22 join at an angle at region 15 opposite the feet to form crossbar 14. Feet 21 and 23 are suitably curved to firmly engage the underside of the workpiece when crossbar 14 is driven into the locked position. Feet 21 and 23 extend through two diametrically opposed slots 24 and 26 in plug sidewall 28 only a relatively short distance in the uninstalled state so that the plug 12 can be readily inserted into the aperture. During installation, the feet are extended outwardly as the crossbar 14 is driven into place. The crossbar 14 has shaped or shoulder portions 40 adjacent the feet 21 and 23 to permit the feet to extend through the slots 24 and 26, while maintaining substantial equality of the distance both feet protrude in the installed state. The bottom portion 34 of the plug 12 also serves as a landing platform for receiving the crossbar 14 as it is driven into the locked position.

Crossbar 14 is typically made of the same material as plug 12, although different materials may be used so long as no undesirable electrochemical or other reactions are set up where the crossbar and the plug touch each other.

Figure 2A:
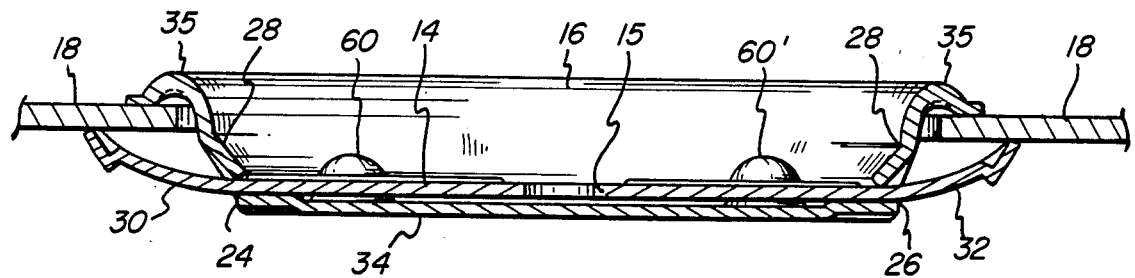
FIG. 2A shows a cross-sectional side view of the improved impact plug assembly of FIG. 2. after installation.

As seen in FIGS. 1, 2 and 2A, a series of dome-shaped dimples 60 and 60', advantageously fabricated in the stamping out of plug 12, are located on the floor 34 with dimples 60 on either side of the leg 20 and dimples 60' on either side of leg 22 of crossbar 14 inwardly of the location at which said legs are in contact with said floor 34 in the uninstalled condition of assembly 10. The height of the dimples 60 and 60' above the floor 34 approximates the mean distance between the underside of legs 20 and 22 and floor 34 at a line joining the uppermost point on each of the pairs of dimples 60 and 60' flanking the two legs.

While the dimples 60 and 60' have been shown in the embodiments of FIGS. 1, 2, and 2A as dome-shaped or hemispherical it is to be understood that other shapes such as cylindrical, cuboid and the like can also be employed without departing from the scope of the present invention.

When the crossbar 14 is forced into the locking position, the ends 30 and 32 of the crossbar 14 are extended through corresponding diametrically opposed slots 24 and 26 in the sidewalls 28 of the plug 12 to engage the workpiece and force the rim 35 and flange 38 into a sealing position again the workpiece. This locked position is shown in FIG. 2A, where aperture 16 has been closed off by plug 12, locked in place against the workpiece 18 by having crossbar 14 impacted at region 15, such as by striking it with a hammer, to force the crossbar ends through the diametrically opposed slots to engage the workpiece 18.

When the assembly 10 is in an unengaged state as shown in FIG. 1, it is important that crossbar 14 not become separated from plug 12, as a plug without a crossbar is useless. The slots 24 and 26 are sized somewhat larger than the feet 21 and 23 extending therethrough so that the crossbar 14 can be driven into place relatively easily. Consequently, adequate means must be provided to ensure that the crossbar is not forced or does not work its way inwardly and out of the slots. If only one foot 21 slips or is forced out of its corresponding slot 24, the worker who uses the plug assembly must reinsert or reposition foot 21 and corresponding leg 20 so that it may be banged through slot 24 to install plug 10. This causes an unnecessary interruption in operations. While the feet of the crossbar must not be easily removable back through the slots once the crossbar has been so inserted, it is also important that the crossbar be relatively easy to insert in the slots in the first place.

Figure 3:
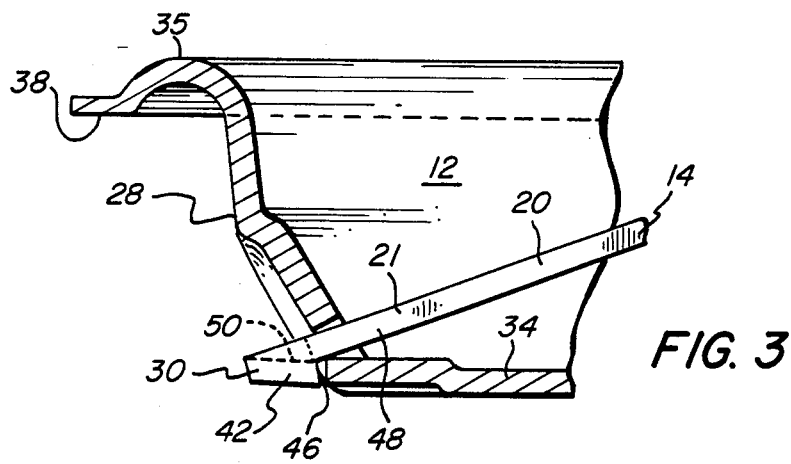
FIG. 3 shows an enlarged cross-sectional side view of a portion of the improved impact plug assembly of FIG. 1.
Figure 4:
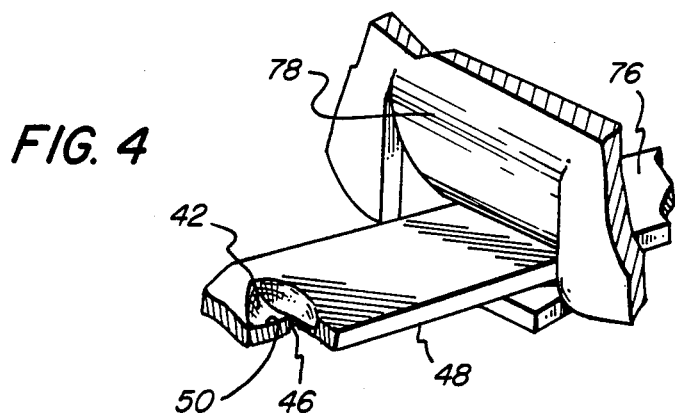
FIG. 4 shows another enlarged cross-sectional view of a portion of the improved impact plug assembly of FIG. 1.

FIGS. 3 and 4 are substantially enlarged and more detailed depictions of portions of the impact plug assembly shown in FIGS. 1 and 2. FIGS. 3 and 4 show shear lip means 42 formed in one end or foot 21 of crossbar 14. Shear lip means 44 is shown in FIGS. 1 and 2 in the other foot 23. Shear lip 42 is formed by displacing or shearing a portion of the material of the crossbar 14 downward to form a protruding abutment surface 46, which is preferably substantially perpendicular to the adjacent flat surface 48 of crossbar 14. However, the angle is not crucial so long as the shear lip is sufficiently abrupt to provide a good register against the plug sidewall. The abutment surface strikes the plug sidewalls adjacent the slot and prevents the crossbar from being removed. This shear lip may be formed by a circular die pressing into the crossbar at some acute angle thereto to shear or displace a halfmoon or fingernail shaped portion of the material downwardly to form shear lip 42. This portion may be curved depending upon the shape of the die. This generates a protuberance projecting from the side of the crossbar opposite the side struck by the die, and also creates a corresponding indentation 50 in the opposite side. This die or other stamping implement need not be circular, but can be of any suitable configuration for producing a shear lip of any size and shape.

With the shear lip 42 of the present invention shown in detail in FIG. 4, insertion outwardly through slot 76 in plug sidewall 78 may be accomplished with relative ease. However, once inserted the crossbar is captured in the plug sidewall 78 and is extremely difficult to pull backward or remove without either exceeding the shear strength of the crossbar material or tearing the sidewall material of the plug. This design utilizes the shear strength of the material, which is typically several orders of magnitude greater than its spring or flex strength, to substantially increase the probability of holding the crossbar and the plug together.

It has been found that the provision of dimples 60 and 60' on the floor 34 of plug 12 serves surprisingly and very dramatically to substantially inhibit the undesirable tendency of a plurality of plug assemblies 10 to become inextricably entangled when stored together in storage bins and the like. Accordingly the simple and elegant means provided by the present invention to overcome this problem represents a significant contribution in saving of time, energy and material cost in the utilization of impact plug assemblies which are used in numbers approaching astronomical proportions in the automobile and like industries.

It should be understood that various changes and modifications to the preferred embodiments described above will be apparent to those skilled in the art. Such changes and modifications can be made without departing from the spirit and scope of the present invention, and it is therefore intended that such changes and modifications be covered by the following claims.

What is claimed is:

1. In an impact plug assembly for engaging a workpiece to close an aperture extending through said workpiece, said assembly being of the type having a plug for insertion into said aperture and a crossbar retained in diametrically opposed slots formed in the peripheral walls of said plug, said crossbar being adapted to be extended outwardly through said slots to lockingly engage said workpiece and sealingly retain said plug in said aperture, said crossbar being restricted from removal inwardly through said slots to separate said bar from said plug before use of said assembly, the improvement comprising raised means provided on said plug at locations flanking those portions of said crossbar which, in the unextended position of the latter, are proximate said slots.

2. An impact plug assembly according to claim 1 wherein said crossbar in the unextended position is angled upwardly at its center from the surface of said plug and said raised means are provided on either side of said crossbar proximate the acute angles formed between said crossbar and the surface of said plug.

3. An impact plug assembly according to claim 1 wherein said raised means are dimples projecting upwardly from the surface of said plug.

4. An impact plug assembly according to claim 3 wherein the height by which said dimples project above the surface of said plug is at least about equal to the gap between the underside of said crossbar and the surface of the plug under said crossbar at the location of said dimples.

5. An impact plug assembly for engaging a workpiece to close an aperture extending through said workpiece, comprising:
a plug sized for insertion into said aperture;
a crossbar retained in diametrically opposed slots formed in the peripheral walls of said plug;
said crossbar having an inverted V-shaped cross section with the apex projecting upwardly above the center of said plug;
said crossbar being adapted to extend outwardly through said slots upon displacement of said crossbar apex towards said plug surface and thereby to lockingly engage said workpiece and retain said plug in said aperture;
raised means provided at locations abutting each side of said crossbar proximate the portions thereof which form the lower extremities of said V-shaped cross-section.

6. An impact plug assembly according to claim 5 wherein said raised means comprises a series of dimples projecting upwardly from the surface of said plug.

7. An impact plug assembly according to claim 6 wherein said dimples project upwardly a distance which is at least about equal to the distance between the underside of the abutting crossbar portion and the surface of the plug.

8. An impact plug according to claim 5 wherein there is at least one raised means on each side of the crossbar at the two locations.

* * * * *